United States Patent [19]

Humbert et al.

[11] Patent Number: 4,723,840
[45] Date of Patent: Feb. 9, 1988

[54] LIQUID CRYSTAL DISPLAY USING OPAQUE FLAPS FOR REFLECTION

[75] Inventors: Jean Humbert, Breuillet; Yvan Archambaud, Paris, both of France

[73] Assignee: Veglia, Paris, France

[21] Appl. No.: 868,023

[22] Filed: May 29, 1986

[30] Foreign Application Priority Data

Jun. 4, 1985 [FR] France ................. 85 08403

[51] Int. Cl.⁴ .............. G02F 1/13; G02F 1/133; G02B 27/00; G01D 11/28
[52] U.S. Cl. ................... 350/345; 362/23; 350/276 R
[58] Field of Search ........... 350/345, 276; 362/19, 362/23, 30, 31

[56] References Cited

U.S. PATENT DOCUMENTS

| 3,838,909 | 10/1974 | Fitzgibbons | 350/345 |
| 4,021,945 | 5/1977 | Sussman | 350/345 |
| 4,124,279 | 11/1978 | Byles | 350/345 |
| 4,310,871 | 1/1982 | Adachi | 362/23 |
| 4,367,923 | 1/1983 | Ishikawa | 350/345 |
| 4,618,216 | 10/1986 | Suzawa | 350/345 |
| 4,621,306 | 11/1986 | Sell | 362/23 |

FOREIGN PATENT DOCUMENTS

| 0066496 | 12/1982 | European Pat. Off. |
| 3029122 | 2/1981 | Fed. Rep. of Germany |
| 3120601 | 12/1982 | Fed. Rep. of Germany |

Primary Examiner—Stanley D. Miller
Assistant Examiner—David Lewis
Attorney, Agent, or Firm—Stevens, Davis, Miller & Mosher

[57] ABSTRACT

A liquid crystal display device is provided comprising a liquid crystal wafer operating by transmission which is disposed in front of a sheet of transparent material having a multitude of parallel opaque flaps substantially perpendicular to the wafer. In daytime use, light rays substantially perpendicular to the wafer pass through the sheet towards the rear of the wafer. For nightime use, the sheet reflects rearwardly of the wafer a part of the light rays coming from a lamp and the flaps stop the other part of these light rays.

5 Claims, 3 Drawing Figures

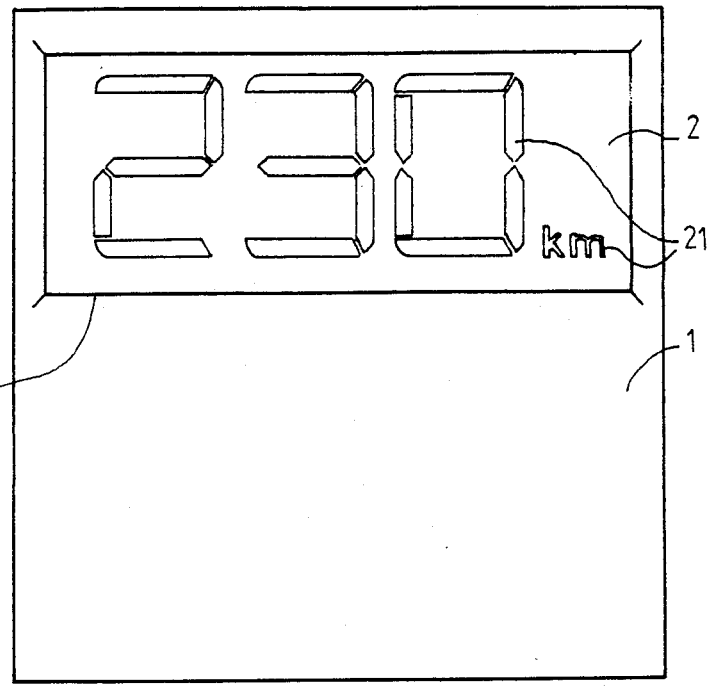
FIG. 1
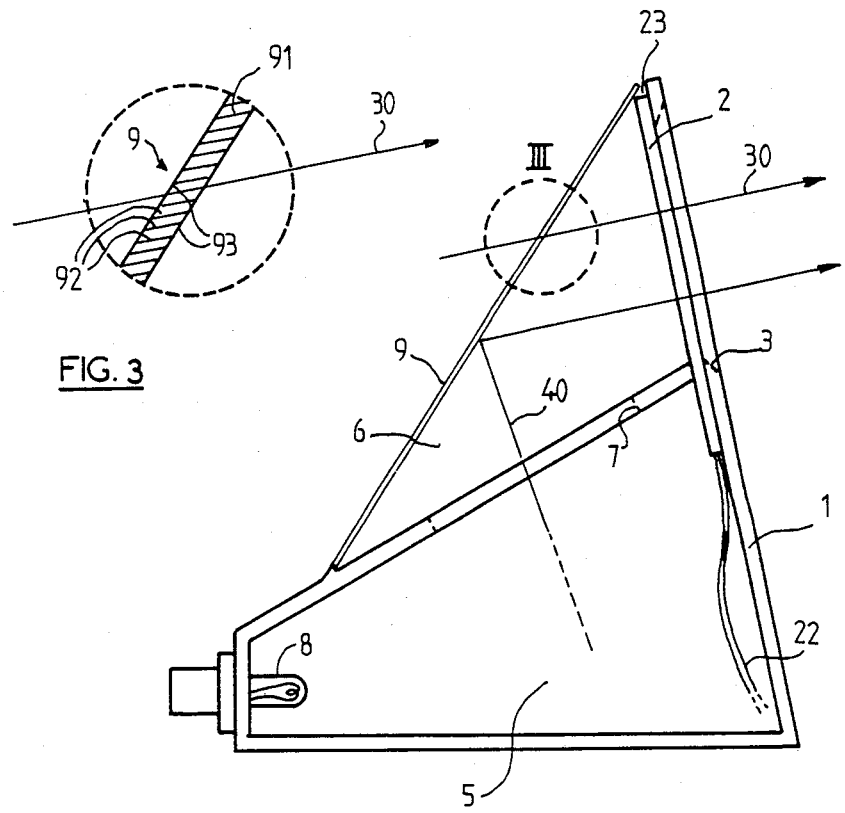
FIG. 3
FIG. 2

LIQUID CRYSTAL DISPLAY USING OPAQUE FLAPS FOR REFLECTION

BACKGROUND OF THE INVENTION

1. Field of the Invention

The present invention relates to a liquid crystal display device functioning by transparency.

Such a device is used for displaying symbols and alpha numeric data resulting for example from measurements made by the instruments on board a motor vehicle nautical or aeronautical vehicles.

On board such a vehicle, it is desirable for the pilot to be able to acquaint himself with display information without ceasing to observe the environment visible through the windscreen, or cockpit, of his vehicle.

2. Description of the Prior Art

Liquid crystal display devices functioning by transparency are known comprising a liquid crystal wafer with control electrodes, normally transparent, whose symbol and character forming zones may become opaque when appropriate electric signals are applied to the control electrodes. Such a liquid crystal wafer, because it may transmit the light coming from behind the wafer or not is said to be of the "functioning by transmission" type. When such a wafer is disposed in the field of vision of the pilot, he then sees the symbols and characters to be displayed in black on a background formed by the surrounding landscape, for example. This device has however, the drawback of requiring a relatively luminous background and it does not allow displayed information to be read at night.

Other liquid crystal display devices functioning by transparency are also known, illuminated by an artificial light and therefore readable even at night. In these devices a liquid crystal wafer is used of a type comparable to the preceding type, that is to say functioning by transmission. An electric lamp for example is placed behind the wafer. So that the pilot is not dazzled by the light rays coming from the lamp and passing through the transparent zones of the wafer, between the wafer and the lamp is interposed a sheet of transparent material, provided with a multitude of opaque parallel and oblique flaps, which function as in a venetian blind for concealing the lamp from the pilot, while letting the oblique light rays pass through the flaps. These light rays illuminate the symbols and characters to be displayed, which diffuse the light and thus appear luminous against a dark background. A device of this type, visible at night, has however the serious drawback that, by day, by simply switching off the lamp, the ambient light cannot be used to cause the symbols and characters to appear over-printed on the landscape, because of the oblique flaps which cut off the substantially horizontal light rays coming from outside. Thus, no liquid crystal display device functioning by transparency is known allowing both daytime display by over-printing on the landscape and a display readable at night.

The present invention aims at providing a device of this type.

SUMMARY OF THE INVENTION

The invention provides, for this purpose, a liquid crystal display device functioning by transparency, comprising a liquid crystal wafer functioning by transmission, characterized by the fact that said wafer is disposed in front of a sheet of transparent material comprising a plurality of parallel opaque flaps, in that means channel the light from a light source in a direction substantially parallel to said wafer towards said sheet disposed for reflecting towards said wafer a part of said light, said flaps being oriented substantially perpendicularly to said wafer so as to cut off the unreflected part of said light. In the device of the invention, used for example in front of the wind shield of a motor vehicle, the substantially horizontal light rays coming from outside pass through the transparent material without being stopped by the opaque flaps, thus allowing in the daytime a display overprinted on the landscape. By night, the part of the light from the light source which is reflected from the sheet of transparent material illuminates the wafer without any risk of dazzling and the unreflected part of this latter, directed substantially vertically, is stopped by the opaque flaps, and remains confined inside the device so as not to diffuse in the passing space.

In this invention, it is remarkable that the applicant has reached the desired result by applying a known product in a novel way. In fact, the use in display devices of a sheet of transparent material having a multitude of opaque flaps is known. However, the prior art always teaches its use by transmission so as to transmit the light only in a certain direction. The idea of the applicant was to use this sheet under reflection, for illuminating the liquid crystal wafer in the darkness from a light source situated out of the view of the pilot and combining a novel application, by reflection, with the known application, by transmission, so as to reach the desired result.

BRIEF DESCRIPTION OF THE DRAWINGS

The invention will be better understood from the following description of the preferred embodiment of the display device of the invention, with reference to the accompanying drawings in which:

FIG. 1 shows a front view of the display device of the invention;

FIG. 2 shows a side view of the device of FIG. 1, and

FIG. 3 shows an enlarged view of the detail inside the circle III of FIG. 2.

DESCRIPTION OF THE PREFERRED EMBODIMENT

A liquid crystal display device, functioning by transparency, is presented to the view of the pilot of the motor vehicle, so that its upper part, in the representation of FIG. 1, is placed in front of the lower part of the wind shield of the vehicle, for example.

The display device comprises a frame 1 adapted for receiving, behind a window 3 formed in its upper part, a liquid crystal wafer 2 of the type functioning by transmission, normally transparent, but whose symbol and character forming zones 21 may become opaque when electric control signals are applied in a known way to the control electrodes connected to a harness of wires 22 shown in FIG. 2.

As can be seen in FIG. 2, the low part of frame 1 forms a first cavity 5 in the top part of which is formed an opening or window 7. A light source, here a lamp 8, is mounted inside the first cavity 5.

A sheet of transparent material 91 having a plurality of opaque and parallel flaps 92 and two faces 93, here smooth, is disposed obliquely above cavity 5 so as to form, with wafer 2, a second adjacent cavity 6 communicating with the first cavity 5 through the opening 7.

Sheet 9 is here the product commercialized under the trade mark "Light Control Film" by the firm 3M.

As shown in FIG. 3, flaps 92 are substantially horizontal.

The display device which has just been described operates as follows.

For daytime use, lamp 8 is switched off and the substantially horizontal light rays such as ray 30, coming from the outside, after passing through the wind shield (now shown) pass through the gaps between the flaps 92 of sheet 9 and the transparent zones of wafer 2.

Thus, the controlled symbols and characters 21 appear in black overprinted on the external landscape. For nightime use, lamp 8 is switched on and light rays such as ray 40, coming from lamp 8, pass through window 7 after multiple reflections, not shown, from the walls of cavity 5 or from a reflector (not shown) because this is conventional. These light rays, thus channelled, are, like ray 40, reflected partly from the interface between the air and the transparent material 91, which interface represents the smooth face 93 situated on the wafer 2 side.

The unreflected part, substantially vertical in direction, of the light transported by ray 40 is stopped by flaps 92 and remains confined inside the device, without diffusing in the passenger space.

In the above description, for nightime use, the light of lamp 8 is reflected by the interface between two media of different indices which is represented by the smooth face 93 situated on the wafer 2 side. This is possible if sheet 9 forms an angle close to 45° with the vertical or the horizontal.

This is not obligatory, and the light from lamp 8 may also be reflected by an assembly of horizontal scores formed in face 93 of the sheet situated on the wafer 2 side. In this case, the shape of the scores, and in particular the angle of the miniscule and numerous facets presented to the light from lamp 8 may be adjusted so that sheet 9 may form an angle different from 45° with the vertical, for example a small angle so as to reduce the space required by the device.

Window 7 may be a simple opening, as shown, or it may comprise opaque strips oriented substantially parallel to wafer 2 for contributing in channelling the light from the lamp and it may be placed for example in the path of the direct rays coming from lamp 8 towards the rear face of the wafer.

What is claimed is:

1. In a liquid crystal display device functioning by transparency, comprising a liquid crystal wafer functioning by transmission, said wafer is disposed in front of a sheet of transparent material comprising a plurality of parallel opaque flaps, and means channel the light from a light source in a direction substantially parallel to said wafer towards said sheet disposed for reflecting back to said wafer at least a part of said light, said flaps being oriented substantially perpendicularly to said wafer for stopping the unreflected part of said light.

2. The display device as claimed in claim 1, wherein said means for channelling said light, comprise a cavity, inside which said light source is disposed, comprising opaque walls, reflecting means, and a window.

3. The display device as claimed in claim 1, wherein scores are formed in the face of the sheet situated on the wafer side for reflecting said light towards said wafer.

4. The display device as claimed in claim 2, wherein said window comprises opaque strips oriented substantially parallel to said wafer for coming in the path of the direct rays from said light source.

5. The display device as claimed in claim 2, wherein scores are formed in the face of the sheet situated on the wafer side for reflecting said light towards said wafer.

* * * * *